United States Patent [19]
Henderson

[11] 4,071,016
[45] Jan. 31, 1978

[54] SOLAR ENERGY COLLECTING APPARATUS

[75] Inventor: Thomas D. Henderson, Elyria, Ohio

[73] Assignee: Solar Energy For The Family Inc., Elyria, Ohio

[21] Appl. No.: 716,522

[22] Filed: Aug. 23, 1976

[51] Int. Cl.² .............................................. F24J 3/02
[52] U.S. Cl. .................................... 126/270; 126/400
[58] Field of Search .................. 165/45; 126/270, 271, 126/400; 237/1 A

[56] References Cited

U.S. PATENT DOCUMENTS

| 965,391 | 7/1910 | Little | 126/270 |
|---|---|---|---|
| 1,074,219 | 9/1913 | Skiff | 126/270 |
| 2,931,578 | 4/1960 | Thompson | 126/270 |
| 2,998,005 | 8/1961 | Johnston | 126/270 |
| 3,102,532 | 9/1963 | Shoemaker | 165/45 |
| 3,964,678 | 6/1976 | O'Hanlon | 126/270 |

Primary Examiner—Kenneth W. Sprague
Attorney, Agent, or Firm—Fay & Sharpe

[57] ABSTRACT

The specification and drawings disclose an apparatus for collecting incident solar radiation and using it to heat a fluid such as air. The disclosed apparatus comprises a housing having a generally triangular cross-section which defines an upwardly facing chamber having its open upper end closed by a sheet of solar transmissive plastic material. Positioned within the chamber, generally at the juncture of the bottom and end wall, is a mass of heat-absorbing material. A plurality of focusing lens are positioned within the chamber and arranged to focus solar radiation upon the mass. Heat absorbed and collected by the mass is extracted by air which is passed over the mass by a duct system including a blower. The blower and duct system is arranged to cause air to pass over and about the heat-absorbing mass to an outlet duct from which it is conveyed to a point of use or storage.

5 Claims, 4 Drawing Figures

U.S. Patent    Jan. 31, 1978    4,071,016
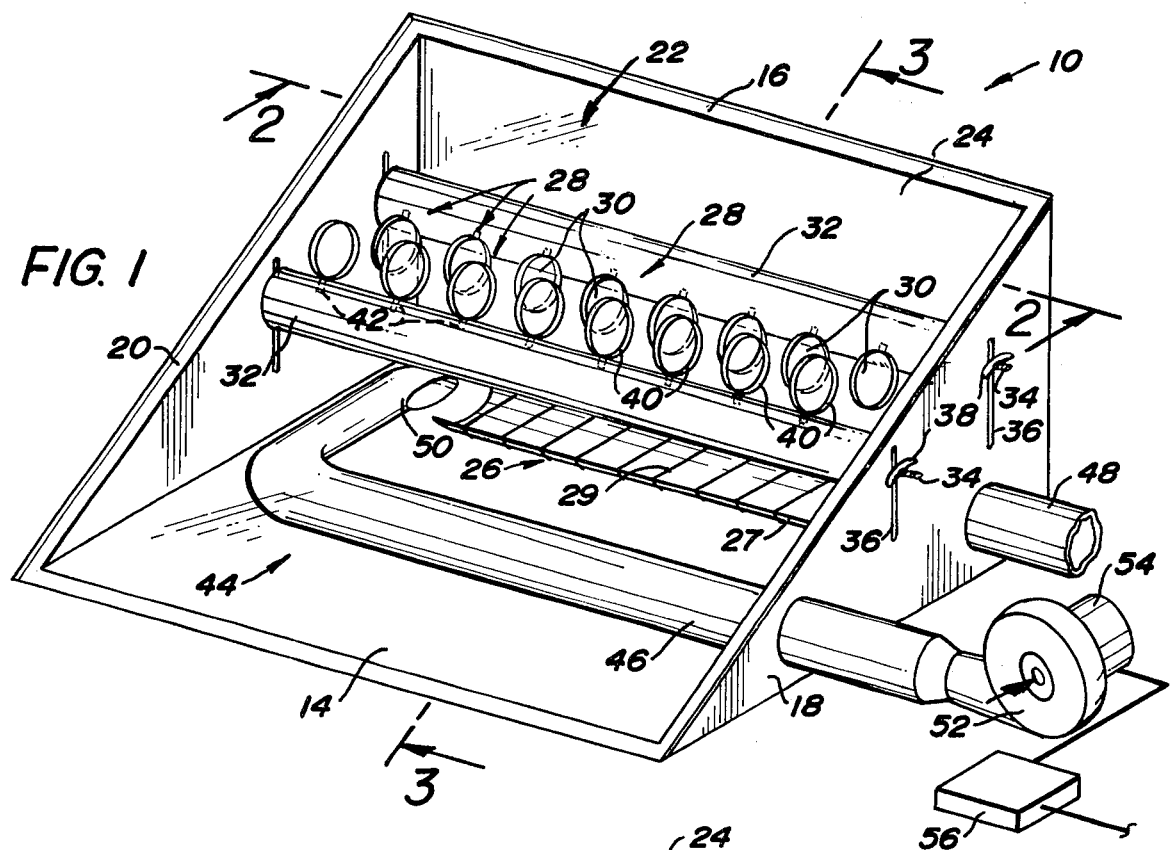
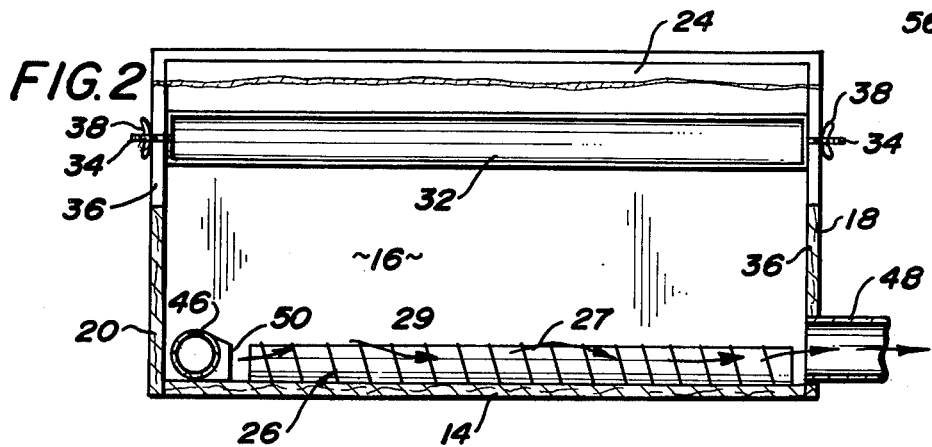
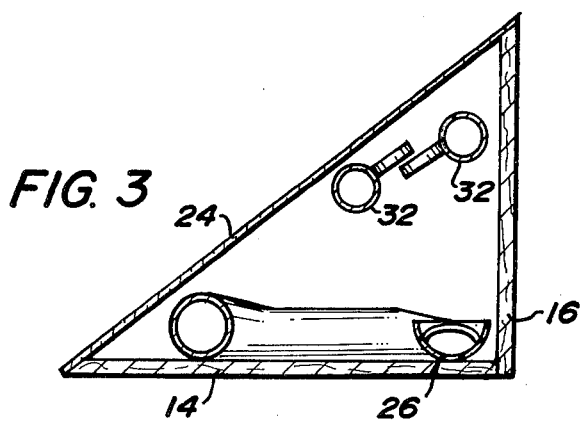
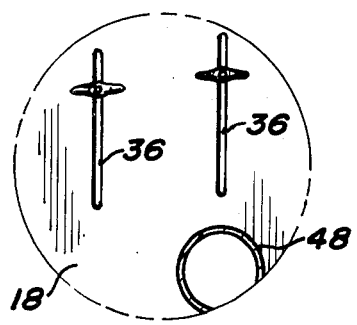

SOLAR ENERGY COLLECTING APPARATUS

BACKGROUND OF THE INVENTION

The present invention is directed toward the art of solar heating and, more particularly, to a solar energy collecting apparatus.

The invention is especially suited for use in collecting solar energy for heating air and will be described with reference thereto; however, as will be appreciated, the invention is capable of broader application and could be used for heating a variety of fluids by incident solar radiation.

There are currently many different types of solar energy collectors available. Often, these become structurally complex and relatively expensive to manufacture and operate. The subject invention has as its primary object the provision of a solar energy collecting apparatus which is generally simple and inexpensive to construct and operate. An apparatus formed in accordance with the subject invention can be readily used for heating air or other gaseous fluids. The apparatus itself can be comparatively compact and is easy to install and maintain.

BRIEF DESCRIPTION OF THE INVENTION

In particular, according to the subject invention, the apparatus proposed generally comprises a housing including a bottom wall and a generally vertically-extending back wall connected by a spaced pair of side walls of triangular configuration. The housing thus defines a chamber having a triangular cross-section and an upwardly facing top. The chamber is closed at the top by a sheet of solar energy transmissive plastic material which is supported by the back and side walls. Positioned within the chamber generally at the juncture of the bottom and back wall is a mass of heat-absorbing and collecting material. Perferably, the mass is positioned such that solar radiation reflecting from the bottom and back walls are directed toward the mass. Additionally, positioned within the chamber over the mass are a plurality of lens members adapted to focus incident solar radiation into comparatively small areas of the mass to cause a comparatively high temperature on the areas to thereby increase the efficiency of heat transfer from the mass to a fluid passing thereover. The apparatus further includes a conduit system adapted to cause a flow of gaseous heat exchange fluid, generally air, to pass over and about the mass to an outlet exit from which it is conducted to a point of use. Preferably, and in accordance with an aspect of the invention, the lens members are mounted in a manner which permits ready adjustment of their angular position and mounting relative to the mass so that most efficient use of the incident solar radiation can be achieved.

Preferably, and in accordance with a more limited aspect of the invention, the conduit means includes a fan which is controlled by a condition sensing apparatus to operate only upon the occurrence of a predetermined condition. Generally, the condition sensing apparatus will be a conventional solar cell adapted to energize the fan motor only when solar radiation is sensed.

Accordingly, as can be seen from the foregoing, the subject invention provides a relatively simple solar heat-collecting apparatus especially suited for heating air.

BRIEF DESCRIPTION OF THE DRAWINGS

The above and other objects and advantages will become apparent from the following description when read in conjunction with the accompanying drawings wherein:

FIG. 1 is a pictorial view of a solar heat-collecting apparatus formed in accordance with the present invention;

FIGS. 2 and 3 are cross-sectional views taken on lines 2—2 and 3—3, respectively, of FIG. 1; and, FIG. 4 is an enlarged view of the circled portion of FIG. 1.

DETAILED DESCRIPTION OF THE PREFERRED EMBODIMENT

Referring more particularly to the drawings wherein the showings are for the purpose of illustrating a preferred embodiment of the invention only, and not for the purpose of limiting same, FIG. 1 shows the general overall arrangement of a heat-collecting apparatus 10 comprising a housing 12. The housing 12 is formed from a bottom wall 14, a generally vertically-extending back or end wall 16, and a pair of spaced side walls 18, 20. The side walls 18, 20 have a generally triangular configuration such that together with the bottom wall 14 and the end wall 16 they define a generally upwardly open chamber 22.

The particular material of which the walls of the housing are formed is not critical to the subject invention. However, the walls should preferably be formed from a material having relatively good heat insulating characteristics. For example, some of the comparatively rigid foamed plastic sandwich materials would be suitable as well as comparatively heavy plywood.

The upwardly open chamber 22 is closed by a sheet of solar energy transmissive material which is mounted on and supported by the top edges of the side walls 18, 20 and the back wall 16. Sheet 24 can be any of the well-known clear plastic sheets used for glazing purposes. The sheet 24 is preferably removably mounted on the side walls 18, 20 and the end wall 16.

Positioned within the chamber 22 and located generally at the juncture of the bottom wall 14 and the end wall 16 is a heat-collecting and absorbing mass 26. Mass 26 could be constituted of many different types of materials; however, in the subject embodiment, it is preferably a half-section of metal tubing 27 wound with copper wire 29. Additionally, mass 26 preferably has a configuration or shape such that air or fluid passing thereover is caused to have a non-laminar flow pattern to produce a scrubbing action to improve the conduction of heat from the mass to the fluid passing thereover. Additionally, it should be understood that the actual position of the mass within the chamber will depend upon the generally angle of incidence of the solar radiation entering the chamber and, for this reason, the mass is preferably arranged so that it can be moved within the chamber to assume a most favorable position relative to the solar radiation entering the chamber through the opened or light transmissive sheet 24. As shown in FIG. 3, the position of the mass 26 is preferably such that solar radiation reflecting from the interior surfaces of the bottom 14 and the end wall 16 are reflected toward the mass.

Positioned above the mass 26 are a plurality of focusing lens means 28. The lens means 28 could be of a variety of types but are shown as convex-shaped lens of the type generally referred to as magnifying lens. In the embodiment under consideration, the lens 30 are mounted directly above the mass 26 at a position such that solar radiation passing through the lens in the direction toward the heat-absorbing mass 26 is focused by each of the lens into a comparatively small area of the mass 26. This relationship is best shown in FIG. 3. This produces a plurality of comparatively high-temperature hot spots in the mass 26 which, it is believed, improves the heat transfer characteristics between the mass and a heat-absorbing fluid passing thereover. Preferably, the lens are supported by means which permit their position to be adjusted relative to the mass 26 from externally of the chamber 22. In the subject embodiment, the lens means include support means in the form of a pair of spaced tubes 32 which extend between the spaced side walls 18, 20. As shown, the ends of the tubes 32 are joined to bolts or studs 34 which pass through vertically-extending slots 36 formed in each of the side walls 18, 20. Wing nuts 38 are received on the bolts 34 and clamp the tubes 32 in adjusted positions relative to their respective slots 36.

The lens elements 30 are supported from the tubes 32 by suitable metallic ring frames 40 which have small thread studs 42 threadedly received in the tubes 32. As can readily be appreciated, this arrangement permits the relative vertical positioning of the two tubes 32 to be adjusted so that the angle of inclination of the lens 30 can be shifted to provide a most favorable focusing of the solar energy against the heat-absorbing mass 26. This relationship is best shown in FIG. 3.

In order to extract the heat absorbed and collected by mass 26, the subject invention includes means for producing a flow of heat exchange fluid over the mass. In the subject embodiment, the heat exchange fluid is simply air; however, as can be appreciated, other types of fluid could be used if desired. Specifically, as shown, the apparatus includes conduit means 44 which include an inlet duct 46 and an outlet duct 48. The duct 46 passes through the side wall 18 and terminates in a comparatively narrow outlet or discharge opening 50 positioned adjacent the left-hand end of the mass 26 as viewed in FIGS. 1 and 2. The outlet duct 48 is also mounted in side wall 18 and is positioned closely adjacent the right-hand end of mass 26 as viewed in FIGS. 1 and 2. As shown, air discharged from outlet end 50 flows over and about the mass 26 to the outlet duct 48. During passage over the mass 26, it absorbs heat collected by the mass and is itself heated to a substantial level. From duct 48, the heated air can be taken directly to a point of use such as a residential building or, of course, it could be passed to a heat storage media for use at some other point in time.

Air flow through the inlet duct 46 is provided by a conventional radial blower fan 52 mounted at the inlet end of duct 46. The fan 52 is driven by an electric motor 54 which is preferably controlled by a condition sensing means 56. Many different types of conventional condition sensing means could be provided for causing actuation of the motor 54. In the subject embodiment, the sensing means 56 is preferably a solar cell unit adapted to turn on the motor 54 only when incident solar radiation is sensed. Consequently, the unit is rendered operably only when a sufficient level of solar radiation is present to make operation economically advisable. Other types of condition responsing means could equally well be used. For example, a temperature responsing means of sensing the temperature of the mass 26 could be used such that the fan is energized only when the mass 26 has been raised to a temperature suitable for extracting heat therefrom.

As can be appreciated from the foregoing, the subject invention provides a comparatively simple and easily constructed and operated solar heat collector which can be used for heating a variety of fluids. Obviously, modifications and alterations of the preferred embodiment will occur to others upon a reading and understanding of the subject specification and it is my intention to include all such modifications and alterations as part of my invention insofar as they come within the scope of the appended claims.

What is claimed is:

1. A solar energy collecting apparatus comprising:
   a housing including a bottom wall, an end wall, and a pair of side walls of generally triangular configuration formed from heat insulating material to define an upwardly open chamber of generally triangular cross-section;
   a solar energy transmissive member carried by said walls over said chamber;
   a heat-absorbing and collecting mass in said chamber generally between said side walls and adjacent the juncture of said bottom wall and said end wall;
   a plurality of lens means mounted in said chamber intermediate said transmission member and said mass for focusing solar energy passing through said transmissive member against said mass;
   adjustable support means for said lens means carried by at least one of said side walls and extending generally between said side walls, said support means permitting selective adjustment of the angle of inclination of said lens means;
   conduit means for directing a fluid to be heated through said chamber in an impinging heat exchange relationship with said mass, said conduit means including an inlet duct extending into chamber to a discharge opening positioned adjacent one end of said mass and an outlet duct extending outwardly of said chamber from an inlet opening positioned adjacent the opposite end of said mass, whereby the fluid to be heated passes from said inlet duct discharge opening across said mass so that heat is transferred from said mass thereto with said fluid then passing into said outlet duct inlet opening for conveyance from said chamber; and,
   means for causing said fluid to flow through said conduit means.

2. The apparatus as defined in claim 1 wherein said adjustable support means includes a portion passing through said at least one side wall for permitting manipulation of said lens means from externally of said chamber.

3. The apparatus as defined in claim 1 wherein said causing means includes a fan means for producing a flow of fluid through said inlet duct.

4. The apparatus as defined in claim 3 further including condition sensing means for causing said fan means to operate only upon the sensing of a predetermined condition.

5. The apparatus as defined in claim 1 wherein said support means comprises at least a pair of generally parallel tube members extending generally transversely between the side walls of said housing, lens means associated with reach of said tube members extending toward the other of said tube members.

* * * * *